United States Patent [19]

Sakamoto

[11] Patent Number: 5,379,339
[45] Date of Patent: Jan. 3, 1995

[54] METHOD AND APPARATUS FOR CALLING A HANDSET UNIT IN RADIO TELEPHONE SYSTEM

[75] Inventor: Naruhiko Sakamoto, Kokubunji, Japan

[73] Assignee: Casio Computer Co., Ltd., Tokyo, Japan

[21] Appl. No.: 40,101

[22] Filed: Mar. 30, 1993

[30] Foreign Application Priority Data

Mar. 31, 1992 [JP] Japan .................................. 4-077626

[51] Int. Cl.6 .......................................... H04M 11/00
[52] U.S. Cl. ...................................... 379/61; 379/58; 379/210; 379/211
[58] Field of Search ...................... 379/58, 60, 61, 201, 379/210, 211, 212; 455/33.1, 33.2

[56] References Cited

U.S. PATENT DOCUMENTS

| | | |
|---|---|---|
| 4,759,051 | 7/1988 | Han . |
| 4,980,907 | 12/1990 | Raith et al. .......................... 455/33.1 |
| 5,197,092 | 3/1993 | Bamburak ............................ 379/59 |
| 5,251,248 | 10/1993 | Tokunaga et al. .................... 379/58 |

FOREIGN PATENT DOCUMENTS 0169726 1/1986 European Pat. Off. .
0298130 1/1989 European Pat. Off. .

Primary Examiner—Curtis Kuntz
Assistant Examiner—Dwayne D. Bost
Attorney, Agent, or Firm—Frishauf, Holtz, Goodman & Woodward

[57] ABSTRACT

A radio telephone system is comprised of a communication network, a cordless telephone apparatus and a plurality of public radio base stations, both being connected to the communication network, and a handset unit of the cordless telephone apparatus is capable of exchanging messages with the plurality of public radio base stations. The cordless telephone apparatus is provided with a control-data storage unit for storing data of controlling handsets unit belonging to the cordless telephone apparatus. The control-data storage unit stores data each comprising a combination of an extension number and a phone number of a handset unit. The cordless telephone apparatus judges whether a handset unit to be reached is in a service area of the apparatus, when the handset unit is called from another handset unit of the cordless telephone apparatus. When it is determined that the handset unit to be reached is not in the service area, the cordless telephone apparatus makes an outside-line calling based on the phone number stored in the control-data storage to reach the handset unit through the public radio base station.

20 Claims, 5 Drawing Sheets

ROM

| CONTROL NUMBER AREA | ID CODE AREA | PHONE NUMBER AREA |
|---|---|---|
| 1 | 303 | 7000 |
| 2 | 304 | 7001 |
| 3 | 305 | 7002 |
| 4 | 306 | 7004 |

FIG.3

RAM

| CONTROL NUMBER AREA | FLAG AREA |
|---|---|
| 1 | |
| 2 | |
| 3 | |
| 4 | |

FIG.5

METHOD AND APPARATUS FOR CALLING A HANDSET UNIT IN RADIO TELEPHONE SYSTEM

BACKGROUND OF THE INVENTION

1. Field of the Invention

The present invention relates to a method and an apparatus for calling a handset unit in a radio telephone system, and more specifically to a method and an apparatus for calling or reaching a handset unit belonging to a radio telephone system of a composite radio telephone system from a telephone set belonging to the same radio telephone system, the composite radio telephone system being comprised of a plurality of radio telephone systems connected through communication circuits to one other, in which a handset unit belonging to one of the radio telephone systems can be used in other radio telephone system.

2. Description of the Related Art

The above mentioned composite radio telephone system is, for example, a cordless telephone system of the second generation, which is under review among Japanese government circles at present. In the cordless telephone system of the second generation, a plurality of public radio base stations and a control center, which controls communications through these public radio base stations, are connected to a communication network which has already been in service, such as a Public Switched Telephone Network (PSTN) and an Integrated Service Digital Network (ISDN). The cordless telephone system allows a handset unit of a cordless telephone apparatus for domestic and business use to be used outside in a similar manner to a conventional Cellular Phone as now being used, when the handset unit has been registered in the control center. That is, the cordless telephone system of the second generation allows a user to use a handset unit not only in a private area, such as at home and at a business place, but also anywhere else for transmitting his voice and receiving voice of a person on the other end.

In the cordless telephone system of the second generation, there are various methods of calling or reaching the handset unit registered in the control center from another telephone set of the cordless telephone apparatus. Routes or channels to reach the handset unit are different depending on places where the handset unit is used, that is, depending on whether the handset unit is used in a private house or in a business place, or whether the handset unit is used outside. In other words, when used in the private house or in the business place, the handset unit can be reached through a private radio base station that is installed in the private house or in the business place, in a similar manner in which a conventional cordless telephone apparatus is reached. A user of a telephone set, therefore, dials for calling an extension phone, i.e., he (or she) operates an extension selection key, and then dials the extension number. Meanwhile, when the handset unit is used outside, the user of the telephone set will dial to get an outside line since the telephone set reaches the handset unit on the other end through the communication network and the public radio base station.

As the handset unit of the cordless telephone apparatus, however, can be used outside in the cordless telephone system of the second generation, the user often takes out the handset unit without telling anyone of his family or fellows. In this case, a person who wants him on the phone operate the extension key at first to reach him at home or at the business place, and when he (or she) is told the user was out, then he has to dial again to get an outside line. As described above, there is a drawback that requires users of the handset units to operate complex dialing operation.

A similar drawback will be invited not only in the cordless telephone system of the second generation but in another composite radio telephone system such as a system, in which a plurality of independent cordless telephone apparatus are installed respectively in separate business places, and are connected to one other through leased circuits, and in which a handset unit of the cordless telephone apparatus installed in one business place is capable of communicating with a radio base station of the other cordless telephone apparatus in other business place.

The present invention has been made to overcome the above mentioned drawback, and has an object to provide a method and an apparatus, for calling or reaching a handset unit, with a simple dialing operation, belonging to a radio telephone system of a composite radio telephone system from a telephone set belonging to the same radio telephone system.

SUMMARY OF THE INVENTION

It would be apparent to those skilled in the art from the following description of preferred embodiments that the present invention may be modified in various manners and may be applicable to other apparatus.

According to one aspect of the present invention, in a composite radio telephone system, in which a plurality of radio telephone systems are connected through a communication network to one another, and a handset unit of one of the radio telephone systems can be used under another one of the radio telephone systems, a method is provided for calling said handset unit of one of the radio telephone systems from a telephone set of the same radio telephone system as the radio telephone system of said handset unit. More specifically, the method comprises:

a first step of previously storing in combination an extension number and a phone number of said handset unit in a memory unit of said same radio telephone system, said extension number being used for calling said handset unit through an extension line of the same radio telephone system and said phone number being used for calling said handset unit through another radio telephone system which is connected to said same radio telephone system through the communication network;

a second step of performing a key operation for designating the extension number of said handset unit stored in said memory unit of the same radio telephone system to calling said handset unit through the extension line of said same radio telephone system; and a third step of outputting to said communication network the phone number of said handset unit which is previously stored, in combination with the extension number of said handset unit, in said memory unit of the same radio telephone system, when said handset unit is not in a service area of said same radio telephone system.

BRIEF DESCRIPTION OF THE DRAWINGS

Other objects and structures of the present invention will be more fully understood from the description, when taken in conjunction with the accompanying drawings, in which:

FIG. 3 is a view showing a structure of a storage unit, provided in ROM of FIG. 2, for storing control data of a handset unit;

FIG. 5 is a view showing a structure of a data storage unit, provided in RAM of FIG. 2, for storing data of a handset unit.

DETAILED DESCRIPTION OF THE PREFERRED EMBODIMENTS

Now, a first embodiment of the present invention will be described with reference to FIGS. 1-4.

Figure 1:
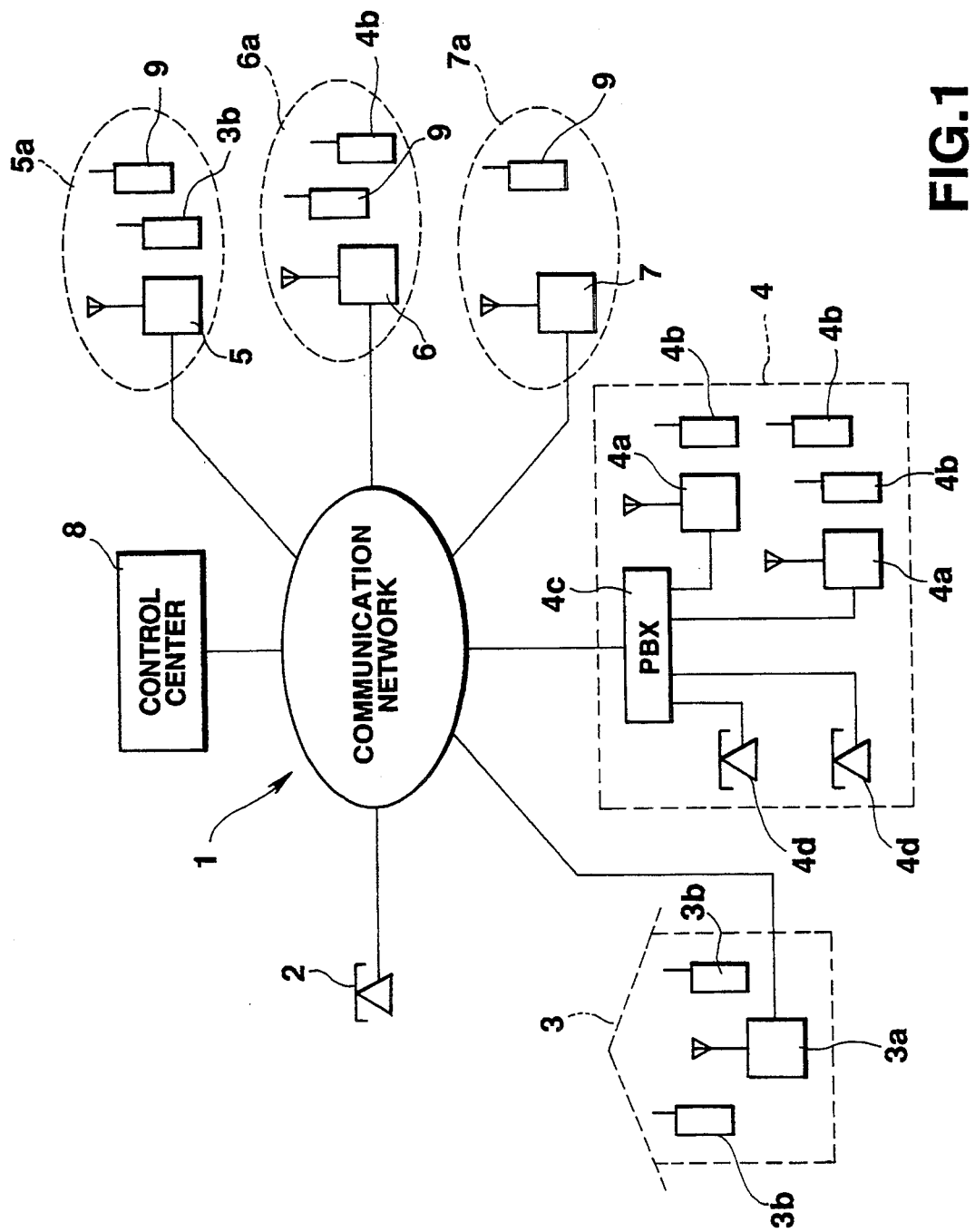
FIG. 1 is a view showing a structure of a composite radio telephone system relating to the present invention.

FIG. 1 is a view showing, by way of example, a structure of a composite radio telephone system relating to the present invention. The structure shown in FIG. 1 is that of the cordless telephone system of the second generation, which is under review among Japanese government circles at present.

In FIG. 1, a reference numeral 1 stands for a communication network, which is composed of PSTN and ISDN, and is now at work. To the communication network 1 are connected a conventional telephone set or a stationary base unit 2, a cordless telephone apparatus 3, a so called system cordless telephone apparatus 4, a plurality of public radio base stations 5-7, and a control center 8, which controls communications through these public radio base stations 5-7. The cordless telephone apparatus 3 includes a radio base station 3a and one or more handset units 3b. The system cordless telephone apparatus 4 is comprised of a plurality of radio base stations 4a and a plurality of handset units 4b. In general, the cordless telephone apparatus 3 is installed in a private house, and the radio base station 3a is connected directly to a subscriber's circuit. Meanwhile, the system cordless telephone apparatus 4 is installed at a company or at a business place, and the radio base stations 4a are connected through a Private Branch Exchange (PBX) 4c to a plurality of subscriber's circuits. A plurality of stationary telephone sets 4d are connected to the PBX 4c, too.

The control center 8 has a subscriber-storage unit, and allows subscribers to communicate only with handset units which have been registered in the subscriber-storage unit through the public radio base stations 5-7. In the subscriber-storage unit are allowed to be registered the handset units 3b of the cordless telephone apparatus 3, handset units 4b of the system cordless telephone apparatus 4 and other handset units 9. Data are registered in the subscriber-storage unit, such as identification codes (ID codes), phone numbers and user's names of the respective handset units. The phone numbers are used for reaching the handset units from the stationary telephone set 2. The control center 8 has an area-data storage unit for storing data that indicates the public radio base stations 5a-7a, in service areas (communication areas) of which registered subscriber's handset units are located at present. When a phone number of the handset unit registered in the subscriber-storage unit is entered from the stationary telephone set 2, a telephone set of the cordless telephone apparatus 3 or a telephone set of the system cordless telephone apparatus 4, the control center 8 determines, from the data stored in the area-data storage unit, the service area where a handset unit to be reached from a calling radio base station is used, and sends the ID code of the handset unit to reach it.

In the above cordless telephone system of the second generation, the calling method, according to the present invention, of reaching a handset unit from one of radio base stations may be applicable to the cordless telephone apparatus 3 and the system cordless telephone apparatus 4.

Now, the calling method according to the present invention will be described, which is applied to the cordless telephone apparatus 3.

Figure 2:
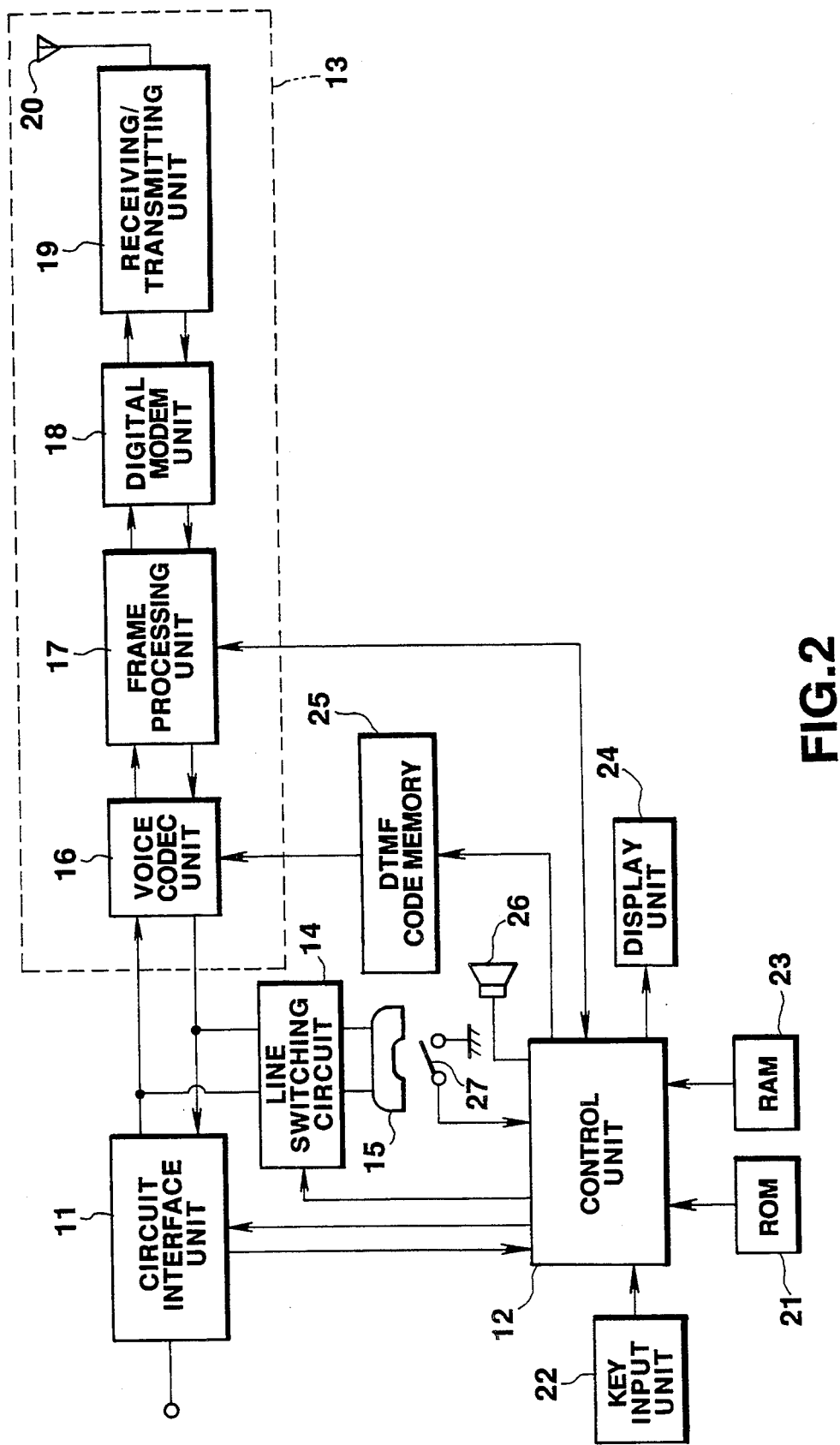
FIG. 2 is a circuit diagram of a radio base station of a cordless telephone apparatus according to the present invention.

STRUCTURE OF RADIO BASE STATION OF CORDLESS TELEPHONE APPARATUS:

FIG. 2 is a circuit diagram of the radio base station 3a of the cordless telephone apparatus 3, to which the calling method of the present invention is applied. The radio base station of the present embodiment has a function of a telephone set, and is provided with a dial key and a handset.

In FIG. 2, a reference numeral 11 stands for a circuit interface unit which is connected to a subscriber's circuit of the communication network 1. The circuit interface unit 11 includes a call detecting circuit which detects a call form the subscriber's circuit, a circuit-connection switching circuit which makes and/or breaks a circuit connection, and a speech network circuit. The call detecting circuit and the circuit-connection switching circuit of the circuit interface unit 11 are connected to a control unit 12, and the speech network circuit is connected to a radio communication unit 13 via a pair of input/output lines. The radio communication unit 13 serves to communicate, by radio waves, with the handset unit 3b of FIG. 1. The radio communication unit 13 is further connected to the control unit 12 for exchanging data such as communication-control data therewith. To the pair of input/output lines which connect the circuit-interface unit 11 with the radio communication unit 13, is connected a handset 15 through a line switching circuit 14 which is controlled by the control unit 12. The handset 15 is arranged to be connected to either of the circuit interface unit 11 and the radio communication unit 13 by means of the line switching circuit 14.

The radio communication unit 13, as described above, serves to communicate, by radio waves, with the handset unit 3b, and the circuit structure is determined depending on an employed modulation and transmission systems of a radio frequency signal.

The cordless telephone system of the second generation under review employs the Quaternary Phase-Shift Keying system ($\pi/4$ shift QPSK) as the modulation system of the radio frequency signal and the Time Division Multiplex Access-Time Division Duplex system (TDMA-TDD) as the signal transmission system. The radio communication unit 13, therefore, is comprised of a audio coder and decoder unit (CODEC) 16, a frame processing unit 16, a digital modulation/demodulation (MODEM) unit 18, a receiving/transmitting unit 19 and an antenna 20. The audio CODEC unit or voice CODEC unit 16 serves to convert an input analog audio signal received from the circuit interface unit 11 or from the handset 15 to a digital audio signal to transfer the same signal to the frame processing unit 17, and serves to convert a digital signal received from the frame processing unit 17 to an analog audio signal to transfer the analog signal to circuit interface unit 11 and the handset 15. The frame processing unit 17 is further connected with the control unit 12, and transfers and/or receives a communication control signal and the digital audio signal based on the TDMA-TDD system. The frame processing unit 17 transfers the communication control signal such as a phone number (ID code) of a handset unit received from the control unit 12 and a digital audio signal received from the audio CODEC unit (voice CODEC unit) 16 to the digital MODEM unit 18 at predetermined timing, and transfers a signal received from the digital MODEM unit 18 to the control unit 12 and the audio CODEC unit 16. The digital MODEM unit 18 serves to modulate a $\pi/4$ shift QPSK signal with a digital signal received from the frame processing signal 17 to send the modulated signal to the receiving/transmitting unit 19, and serves to demodulate the $\pi/4$ shift QPSK signal received from the receiving/transmitting unit 19 to a digital signal to transmit the demodulated signal to the frame processing unit 17. The receiving/transmitting unit 19 converts the $\pi/4$ shift QPSK signal into a radio wave in the UHF band to transmit the signal through an antenna 20, and receives the $\pi/4$ shift QPSK signal through the antenna 20.

The control unit 12 performs a control operation of telephone calls and communication through the circuit interface unit 11 and the radio communication unit 13, and performs other control operation. The control unit 21 includes a micro-processor, which performs the above control operations in accordance with a program stored in a read only memory (ROM) 21.

The ROM 21 stores not only a control program but also an ID code of the radio base station 3a and control data for controlling the handset unit 3b. FIG. 3 is a view illustrating a detailed control-data storage unit, provided in ROM 21, for storing the control data. As shown in FIG. 3, the control-data storage unit of ROM 21 is provided with a control-number area for storing control numbers of handset units, an ID-code area for storing ID codes of the handset units and a phone-number area for storing phone numbers for calling handset units through an outside line, and will memorize a set of data with respect to each of handset units which are under control of the radio base station. Each set of data consists of a control number, an ID code and a phone number of one handset unit. One of the features of the present invention is that the control-data storage unit of the ROM 21 memorizes, as data for controlling a handset unit belonging to a cordless telephone apparatus, not only the control number and ID code of the handset unit but also the phone number of the handset unit for calling the same unit through an outside line. The ID code of each of the handset units stored in the control-data storage unit of the ROM 21 is used a calling number for reaching the handset unit through the above radio communication unit 13, and is further used to determine whether a communication is requested by a handset unit which is under control of the radio base station.

The control unit 12 is connected with a key input unit 22, a random access memory (RAM) 23, a display unit 24, a DTMF code memory 25, a speaker 26 and a hook switch 27. The key input unit 22 is provided with 12 dial keys for entering dial data and an extension selecting key for reaching an extension phone through the radio communication unit 13. The RAM 23 memorizes dial data and the like entered from the key input unit 22, and the display unit 24 displays the dial data and the like entered from the key input unit 22. The DTMF code memory 25 is for outputting through the above audio CODEC unit 16 a Dual-Tone Multi-Frequency (DTMF) signal corresponding to the dial data entered from the key input unit 22. The speaker audibly announces a call made from a subscriber's circuit or a handset unit. The hook switch 27 serves to detect that the above handset 14 is picked up.

CALLING PROCESS OF HANDSET UNIT

A calling process will be described with reference to a flow chart of FIG. 4, which is performed to call or reach a handset unit 3b that is under control of a radio base station 3a, using a telephone function of the radio base station 3a. It is assumed in the present embodiment that, when an extension phone is wanted, a user unhooks the handset 15, operates the extension selecting key, and then operates the dial keys to enter an extension number while, when an outside line is wanted, the user unhooks the handset 15, and operates the dial keys to enter a phone number of a telephone to be reached. Further it is assumed that, when an extension phone is called, the control unit 12 once turns on the circuit connection switch in the circuit interface unit 11. Hereafter, the calling process will be described with the above assumption.

Figure 4:
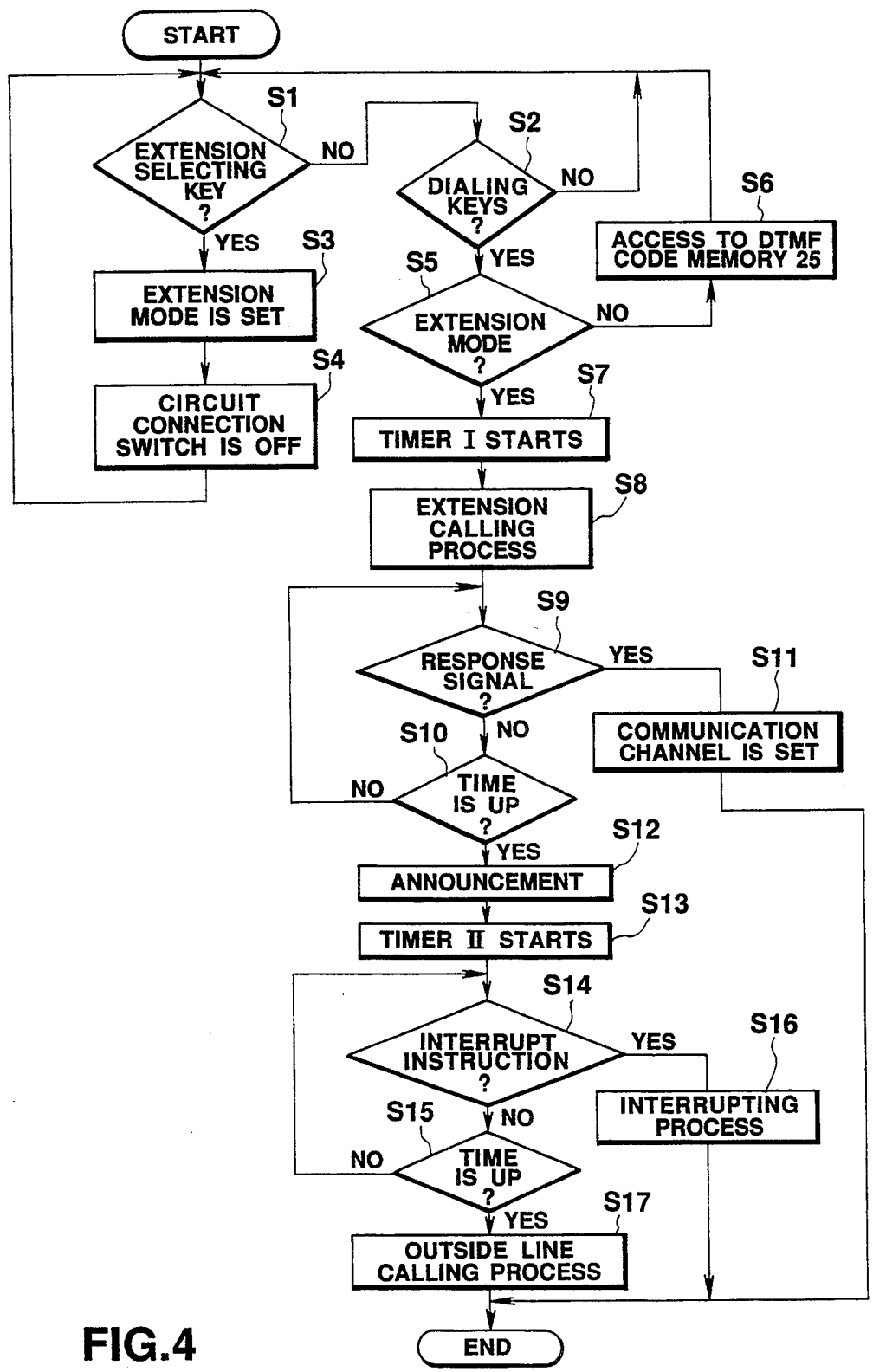
FIG. 4 is a flow chart of a calling process for reaching a handset unit in a first embodiment of the present invention.

When the handset 15 is unhooked, the control unit 12 judges, at step S1 of the flow chart of FIG. 4, whether the extension selecting key in the key input unit 22 is operated, and further judges at step S2 whether the dial keys are operated. The control unit 12 repeatedly executes processes at steps S1 and S2 until the control unit 12 determines at step S1 that the extension selecting key is operated.

When the control unit 12 determines at step S1 that the extension selecting key has been operated, the control unit 12 sets an extension mode at step S3 and turns off the circuit connection switch in the circuit interface unit 11 at step S4. Then, the control unit 12 returns to step S1.

When the control unit 12 determines at step S2 that the dial keys have been operated, it is judged at step S5 whether the extension mode is set. When the extension mode is not set, the control unit goes to step S6, where the control unit 12 accesses the DTMF code memory 25 based on the key code entered by operation of the dial keys to make the DTMF code memory 25 output DTMF code corresponding to the key code. The DTMF code output from the DTMF code memory 25 is converted to a DTMF signal by the audio CODEC unit 16, and then is output to the communication network 1 through the circuit interface unit 11 and the subscriber's circuit. The DTMF signal is recognized as one digit by an interface unit or an exchange provided between the subscriber's circuit and the communication network 1. Finishing the process (an accessing process to the DTMF code memory 25) at step S6, the control unit 12 returns to step S1, and waits for another key input. The accessing process to the DTMF code memory 25 at step S6 is executed every dial key operation while the extension mode is not set.

To get an outside line, as described above, the user unhooks the handset 15, and then operates the dial keys without operating the extension selecting key. When the user wants to directly reach the handset unit taken out, he (or she) operates the keys in the same manner as described above to get an outside line. In other words, the user unhooks the handset 15, and operates the dial keys of the key input unit 22 to enter the phone number of the handset unit he wanted. In this manner, data for designating the handset unit to be reached is transferred to the control center 8 of FIG. 1, and then the control center 8 calls the designated handset unit through a relevant base station among the public radio base stations 5–7, when the designated handset unit is anywhere in the calling areas 5a to 7a.

When, at step S5 of the flow chart of FIG. 4, the control unit 12 determines that the extension mode has been set, i.e., when the extension selecting key has been operated before the dial keys are operated, the control unit 12 starts a timer (I) at step S7, which is provided in the control unit 12 itself, and then starts an extension calling process at step S8. The extension calling process is a process for calling or reaching the relevant handset unit through the radio communication unit 13 in accordance with an extension number entered through the dial keys i.e., the control number of the handset unit to be reached. For example, when the dial key representative of a numeral "1" is operated after operation of the extension selecting key, i.e., when a handset unit of the control number "1" is designated to be reached, the ID code "303" corresponding to the control number "1" (refer to FIG. 3) is read out from among a plurality of ID codes of handset units stored in the control data storage unit of the ROM 21, and the ID code "303" is transferred to the frame processing unit 17 of the radio communication unit 13. Then, a calling signal for calling the handset unit of the control number "1" is output through the antenna 20 of the radio communication unit 13. The timer (I) serves to rule a time for performing the extension calling process. The time for performing the extension calling process will be enough, if the time is enough for the user carrying the handset unit which is called to confirm the call signal without failure, and to operate keys responding to the call signal.

After the extension calling process of step S8 has been finished, the control unit 12 judges at step S9 whether a response is made by the handset unit of the control number "1", and further judges at step S10 whether the timer (I) counts up the time. The control unit 12 repeatedly performs the judging processes of steps S9 and S10. When a response signal is sent back responding to the above call signal from the handset unit of the control number "1" before the timer (I) counts up the time, the control unit 12 advances from step S9 to step S11, where it interrupts the extension calling process, and sets a channel for communication. The channel for communication, which has been set at step S11, allows communication between the handset 15 and the handset unit of the control number "1" through the radio communication unit 13.

When the timer (I) counts up the time, the control unit 12 goes to step S12, where it interrupts the extension calling process, tells through the speaker 26 that the handset unit to be reached is not within the calling areas and indicates on the display unit 24 to that effect, and simultaneously starts a time (II) provided in the control unit 12 itself at step S13. The timer (II) serves to rule a time required to automatically call the handset unit through an outside line. The time ruled by the timer (II) will be enough, if the same is enough for a caller who learns at step S12 that the handset unit is not within the calling areas to determine whether he (she) should call the handset unit through an outside line, and to operate to interrupt the process for calling the handset unit through an outside line, for example, to hook the handset, when he determines not to call the handset unit through an outside line. It is preferable to keep displaying on the display unit 24 that the handset unit to be reached is not within the calling areas and telling to that effect through the speaker 26 until the timer (II) counts up the time. More preferably, the timer (II) is a subtracting timer which counts a time left before the time is up, and the display unit 24 displays the left time counted by the timer (II), as time goes by.

After starting the timer (II), the control unit 12 judges at step S14 whether an instruction of interrupting the line calling process has been given, and judges at step S15 whether the timer (II) has counted up the ruled time. The control unit 12 repeatedly executes the judging processes of steps S14 and S15. When the instruction of interrupting the line calling process is given before the timer (II) has counted up the ruled time, the control unit 12 advances to step S16, where it executes a process for interrupting the line calling process at step S17, as will be described later in detail, of calling or reaching the handset unit of the control number "1" through an outside line. More specifically, the process for interrupting the line calling process is a process to stop the timer (II).

When the timer (II) has counted up the time, the control unit 12 goes to step S17, where it executes the line calling process to reach the handset unit of the control number "1" through an outside line. More specifically, the control unit 12 sends a signal to the circuit interface unit 11 to turn on the line connection switch provided in the circuit interface unit 11, and simultaneously reads out a phone number "7000" of the handset unit of the control number "1" (see FIG. 3) from the control-data storage unit of the ROM 21 and sends the read out phone number "7000" to the DTMF code memory 25. Then, the audio CODEC unit 16 generates a DTMF signal corresponding to the phone number "7000". The generated audio CODEC signal is output through the circuit interface unit 11 to the communication network 1 of FIG. 1. Then, the handset unit of the control number "1" is reached through the relevant one of the public radio base stations 5–7, when the handset unit is anywhere in the service areas 5a–7a of FIG. 1.

In the present embodiment, as described above, not only the ID code of the handset unit for getting an extension but also the phone number for calling the handset unit through an outside line are previously stored as control data of the handset unit in the ROM 21. When the handset unit is called through the extension and no response is made from the handset unit within a predetermined time duration, the control unit 12 reads out the phone number of the handset unit stored in the ROM 21 and automatically calls the handset unit through an outside line using the read out phone number. Therefore, even if the handset unit is carried outside, the caller can reach the handset unit only by dialing to get an extension and is not required to operate a dialing operation to get an outside line. Accordingly, the dialing operation to reach the handset unit is greatly simplified.

STRUCTURE OF RADIO BASE STATION IN SECOND EMBODIMENT

Now, a second embodiment of the present invention will be described. In the second embodiment, data is memorized in the radio base station, which data indicates whether the handset unit under control of the radio base station is in the service area of the radio base station. When the extension calling operation is effected to reach the handset unit through an extension, it is automatically determined based on the data memorized in the radio base station whether an extension or an outside line is used to reach the handset unit. The above data may be memorized in a RAM, which data indicates whether the handset unit is in the service area of the radio base station.

The structure of the radio base station of the second embodiment is substantially the same as the radio base station of the first embodiment shown in FIG. 2, and therefore is not shown in figure. The second embodiment of the present invention will be described with reference to FIG. 2, which illustrates the structure of the radio base station of the first embodiment.

The above data is memorized in the RAM 23 connected to the control unit 12, which data indicates whether the handset unit is in the service area of the radio base station.

FIG. 5 is a view showing in detail a storage unit, provided in the RAM 23, for storing the above mentioned data. As shown in FIG. 5, the storage unit is provided with a phone number area for storing control numbers of handset units and a flag area for storing flag data which indicates whether the handset unit is in the service area of the radio base station. The storage unit of the RAM 23 will memorize set-data with respect to all of the handset units which are under control of the radio base station, each of which set-data consists in combination of the control number of the handset unit and flag data indicating whether the handset unit is in the service area of the radio base station 3a.

The above flag data is used in a system of the cordless telephone apparatus 3 which is arranged such that the radio base station 3a periodically transmits a response requesting signal to the handset unit 3b, and upon receipt of the response requesting signal, the handset unit 3b immediately sends back an acknowledge signal. The radio base station 3a periodically transmits the response requesting signal to the handset unit 3b. The radio base station 3a raises a flag of the handset unit 3b which sends back the acknowledge signal to the radio base station 3a while it lowers the flag of the handset unit 3b which does not sends back the acknowledge signal within a predetermined time duration. There is no need for concern about power consumption of a battery of the handset unit, because the battery may be charged at home any time or the battery is always charged.

CALLING PROCESS FOR REACHING HANDSET UNIT IN SECOND EMBODIMENT

Figure 6:
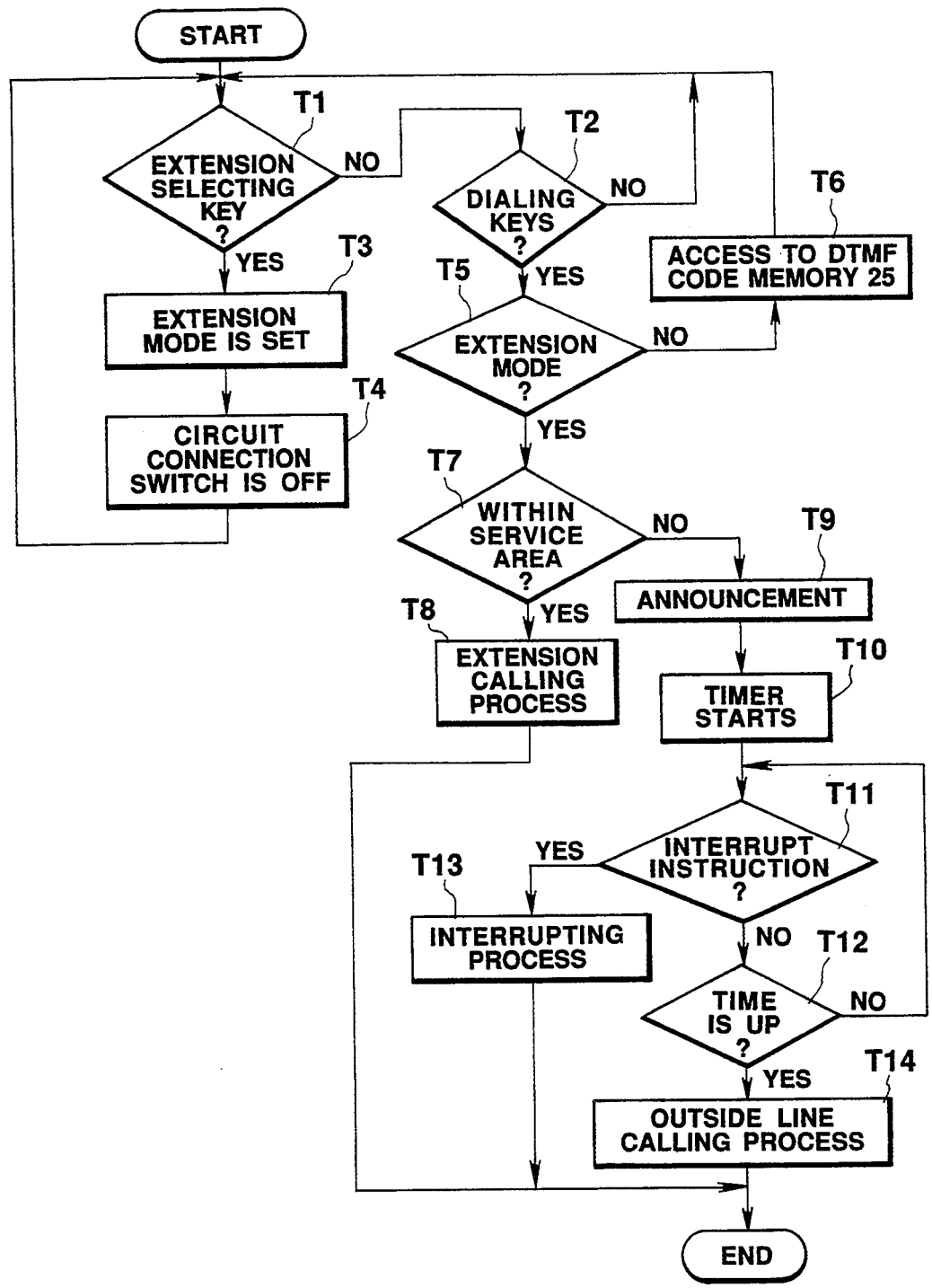
FIG. 6 is a flowchart of a calling process for reaching a handset unit in a second embodiment of the present invention.

FIG. 6 is a flowchart of a calling process for reaching a handset unit in the second embodiment. The second embodiment will be described with assumption that the same dialing operation as described in the first embodiment will be performed to get an extension or an outside line in the second embodiment.

In FIG. 6, processes at steps T1–T6 are the same as the processes at steps S1–S6 shown in FIG. 4. When the handset 15 is unhooked, judging processes of key operations are executed at steps T1 and T2. When it is determined at step T1 that the extension selecting key has been operated, an extension mode is set at step T3 and a circuit connection switch is turned off at step T4. When it is determined at step T2 that the dial keys have been operated, it is judged at step T5 whether the extension mode is set. When the extension mode is not set, an accessing process is performed at step T6 for accessing to the DTMF code memory 25, and a telephone is called through an outside line calling in a conventional manner.

In the second embodiment, flag data is memorized in RAM 23, which data indicates whether a handset unit under control of the radio base station is in the service area of the radio base station, and it is automatically determined based on the memorized flag data which an extension or an outside line is to be used. The second embodiment is different from the first embodiment in operation which is to be performed when it is determine at step T5 that the extension mode has been set.

When it is determine at step T5 that the extension mode has been set, the control unit 12 goes to step T7, where it is judged based on the flag data stored in the RAM 23 whether a handset unit, an extension number (control number) of which is entered by operation of the dial keys, is in the service area of the radio base station. For example, if an extension number "2" is entered by the dial keys, flag data corresponding to the control number "2" is read out from the RAM 23 and it is judged based on the read flag data whether the handset unit of the control number "2" is in the service area.

When it is determined at step T7 that the handset unit of the control number "2" is in the service area, the control unit 12 goes to step T8, where it executes the extension calling process. More specifically, an ID code "304" corresponding to the control number "2" (refer to FIG. 3) is read out from the control-data storage unit of the ROM 21 and is sent to the frame processing unit 17 of the radio communication unit 13. Then, a call signal for calling the handset unit of the control number "2" is sent from the antenna 20 of the radio communication unit 13. The call signal is kept being sent until an interrupting operation is effected to interrupt a calling process (for example, the handset 15 is hooked again) or a response signal, which is responsive to key operation by the user of the handset unit, is received from the handset unit of the control number "2".

When it is determined at step T7 that the handset unit of the control number "2" is not in the service area, the control unit 12 goes to step T9, where the same process is executed as the processes executed at steps S12–S17 of FIG. 4 in the first embodiment. More specifically, it is displayed on the display unit 24 or is announced by the speaker 26, at step T9, that the handset unit is not in the service area. At step T10, the control unit 12 starts the timer provided in the control unit 12 itself. The timer has the same function as the timer (II) of the first embodiment. The timer rules a time required to automatically call the handset unit through an outside line. It is preferable to indicate that the handset unit is not in the service area while a left time being displayed on the display unit 24, until the timer counts up the ruled time in the same manner as described in the first embodiment.

After the timer starts, the control unit 12 judges at step T11 whether an instruction is given to interrupt the outside line calling process, and further judges at step T12 whether the timer counts up the ruled time. The control unit 12 repeatedly performs the judging processes at steps T11 and T12. When the instruction of interrupting the outside line calling process is given before the timer has counted up the ruled time, the control unit 12 goes to step T13, where the control unit 12 interrupts the outside line calling process, thereby stopping reaching the handset unit of the control number "2" through an outside line, and further stops the timer.

When the timer has counted up the ruled time, the control unit 12 goes to step T14, where it performs the outside line calling process to reach the handset unit 5 through an outside line. More specifically, the control unit 12 sends a signal to the circuit interface unit 11, thereby turning on the circuit connection switch in the circuit interface unit 11, and simultaneously reads out a phone number "7001" of the handset unit of the control number "2" (refer to FIG. 3) from the control-data storage unit of the ROM 21. The read out phone number "7001" is sent to the DTMF code memory 25. Then, the audio CODEC unit 16 generates a DTMF signal corresponding to the phone number "7001", and sends the generated signal through circuit interface unit 11 to the communication network 1 of FIG. 1. If the handset unit of the control number "2" is anywhere in the service areas 5a–7a shown in FIG. 1, the handset unit is called through the relevant one of the public radio base stations.

In the second embodiment, the RAM 23 is provided with a storage unit for storing data which indicates whether handset units under control of the radio base station is in the service area of the radio base station, and the data stored in the storage unit are updated periodically. When a dialing operation is executed to get an extension, it is judged based on the data stored in the storage unit whether the wanted handset unit is in the service area of the radio base station, and the wanted handset unit is reached automatically through an extension or an outside line. The wanted handset unit therefore can be reached even through an outside line in a comparably short time, even though the handset unit is not in the service area of the radio base station.

Therefore, when an outside-line phone number itself is registered and a shortened number is not registered in place of the outside-line phone number, i.e., when a user is required to dial every digit of the phone number, the above described dialing operation for getting or reaching an extension allows the user to reach a handset unit in a simpler way than by dialing every digit of the phone number.

MODIFIED EMBODIMENTS

Now, a modified embodiment will be described. In the first and second embodiments, when it is determined that a handset unit to be reached is not in the service area of the radio base station, an announcement to that effect is made and the timer is started simultaneously. When the time counts up a time, an outside line calling is automatically made. But the outside calling may be made manually. More specifically, when an announcement is made to inform that the handset unit to be reached is not in the service area and a predetermined key is manipulated to instruct an outside line calling before the handset 15 is hooked, it is possible to make an outside line calling based on the phone number of the handset unit to be called read out from the control-data storage unit in the ROM 21. In this case, an additional key operation has to be made compared with the first and second embodiments, but the handset unit can be reached through an outside line in a shorter time compared with the first and second embodiments because the outside line calling is effected at a time of manipulation of the predetermined key. In the first embodiment, after the announcement is made for informing that the wanted handset unit is not in the service area, it is detected whether the predetermined key is manipulated for instructing an outside line calling, but the detection may be made during the extension calling operation. More specifically, a process for judging whether the predetermined key has been manipulated may be inserted into the Judging processes which are repeatedly executed at steps S9 and S10 the flow chart of the calling process, shown in FIG. 4, for calling a handset unit, whereby the outside line calling will be made in a more shorter time.

Furthermore, the first and second embodiments have been described, in which a handset unit is called through the key input unit 22 installed in the radio base station. This calling method may be applied when the handset unit is called from another handset unit of a cordless telephone apparatus. In this case, the radio base station serves as a relay station for calling the handset unit and for controlling communication between a calling handset unit and a call-accepting handset unit. The radio base station is similar in structure to the radio base station illustrated in FIG. 2 but is different merely in an internal structure of the frame processing unit 17. The radio base station therefore is not shown but only different parts of the frame processing unit will described.

The frame processing unit 17 in the first and second embodiments transmits a digital audio signal from the digital MODEM unit 18 to the audio CODEC unit 16, and further transmits the digital audio signal in the opposite direction.

To control the communication between the calling handset unit and the call-accepting handset unit, the frame control processing unit 17 has to transmits, upon receipt of a digital audio signal from the calling handset unit, the received digital audio signal to the digital MODEM unit 18 at timing of transferring a signal to the call-accepting handset unit, and also has to transmit, upon receipt of the digital audio signal from the call-accepting handset unit, the received digital audio signal to the digital MODEM unit 18 at timing of transferring a signal to the calling handset unit. In the present embodiment, the TDMA-TDD system is employed as a signal transmitting system. More specifically, the frame processing unit 17 temporarily holds therein a digital audio signal which comes first, and first transmits to the digital MODEM unit 18 a digital audio signal which comes last.

Therefore, the frame processing unit 17 in the present embodiment is arranged to transfer audio data, for example, to a transmitter buffer in the frame processing unit 17 to temporarily hold therein, the audio data which the frame processing unit 17 receives first through the digital MODEM 18, and to transfer audio data from the transmitter buffer of the frame processing unit 17 directly to the digital MODEM unit 18, the audio data which the frame processing unit 17 receives last. The frame processing unit 17 may be provided with an additional transmitter buffer. Further the frame processing unit 17 may be arranged to transfer audio data, respectively, to separate transmitter buffers, the audio data which the frame processing unit 17 separately receives from two handset units at different times, and to send the audio data from the separate transmitter buffers to the digital MODEM unit 18 at predetermined timing.

In other words, the frame processing unit 17 of the present embodiment is arranged not only to transmit the digital audio signals received from the digital MODEM 18 to the audio CODEC unit 16 but also to transmit the received digital audio signals to the digital MODEM unit 18 at respective timing. The above transmitting operation of the frame processing unit 17 may be switched depending on which mode, a normal mode or a relay mode, has been set.

Now, different points in the calling process of the present embodiment will be described.

When a handset unit is called or designated from another handset unit of the cordless telephone apparatus, a dialing operation for reaching the handset unit through an extension line and a key operation for interrupting a dialing operation for reaching an outside line are performed at the calling handset unit. The judging process, which is performed by the control unit 12 in accordance with a signal entered from the key input unit 22 in the first and second embodiments, that is, the precesses at steps S1, S2 and S14 of FIG. 4 or the processes at steps T1, T2 and T11 of FIG. 6 are performed based on a key code signal of the calling handset unit, which is entered through the frame processing unit 17 from the antenna 20.

Since an announcement for informing that a handset unit to be reached is not in the service area has to be made at the calling handset unit, the announcing processes at step S12 of FIG. 4 and at step T9 of FIG. 6 will be performed in a process for sending an instruction signal of announcement to the calling handset unit in the present embodiment.

The calling method of the present invention will be applicable to the system cordless telephone apparatus. When the calling method is applied to the system cordless telephone apparatus, it is preferable that a memory unit for storing control data of a handset unit and flag data indicating whether the handset unit is in the business place is provided in an exchange function unit of the system cordless telephone apparatus rather than in each of a plurality of radio base stations. For example, it is preferable in the system cordless telephone apparatus 4 shown in FIG. 1 that the memory unit is installed on the PBX 4c, whereby all of the handset units belonging to the system cordless telephone apparatus are put under uniform control, and are reached in a simple manner.

Several embodiments of the present invention have been described in detail but these embodiments are simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. In a composite radio telephone system, in which a plurality of radio telephone systems are connected through a communication network to one another, and a handset unit of one of the radio telephone systems can be used under another one of the radio telephone systems, a method for calling said handset unit of one of the radio telephone systems from a telephone set of the same radio telephone system as the radio telephone system of said handset unit, said method comprising:

a first step of previously storing in combination an extension number and a phone number of said handset unit in a memory unit of said same radio telephone system, said extension number being used for calling said handset unit through an extension line of the same radio telephone system and said phone number being used for calling said handset unit through another radio telephone system which is connected to said same radio telephone system via the communication network;

a second step of performing a key operation for designating the extension number of said handset unit stored in said memory unit of the same radio telephone system to calling said handset unit through the extension line of said same radio telephone system; and a third step of outputting to said communication network the phone number of said handset unit which is previously stored, in combination with the extension number of said handset unit, in said memory unit of the same radio telephone system, when said handset unit is not in a service area of said same radio telephone system.

2. The method according to claim 1, wherein said third step comprises the steps of:

judging whether a response signal is received from said handset unit within a first predetermined time duration after said key operation has been performed to call said handset unit through the extension line of said same radio telephone system; and outputting the phone number of said handset unit to said communication network, when it is determined that the response signal has not been received from said handset unit within the first predetermined time duration.

3. The method according to claim 2, wherein said third step further comprises the step of:

announcing that the response signal has not been received from said handset unit, when it is determined that the response signal has not received from said handset unit within the first predetermined time duration.

4. The method according to claim 3, wherein said third step further comprises the step of:

stopping the step of outputting the phone number of said handset unit to said communication network when an instruction is given within a second predetermined time duration to stop calling said handset unit through another radio telephone system after the step has started of announcing that the response signal has not been received from said handset unit.

5. The method according to claim 3, wherein said third step further comprises the step of:

outputting the phone number of said handset unit to the communication network, when an instruction is given within the first or second predetermined time duration to call said handset unit through another radio telephone system.

6. The method according to claim 1, wherein said third step comprises the steps of:

judging depending on data, which is periodically updated and stored in said memory unit of said same radio telephone system, whether said handset unit is in the service area of said same radio telephone system, said data being representative of whether said handset unit is in the service area of said same radio telephone system; and outputting to said communication network the phone number of said handset unit stored in said memory unit of the same radio telephone system, when it is determined that said handset unit is not in the service area of said same radio telephone system.

7. The method according to claim 3, wherein said third step further comprises the step of:

announcing that said handset unit is not in the service area of said same radio telephone system, when it is determined that said handset unit is not in the service area of said same radio telephone system.

8. The method according to claim 7, wherein said third step further comprises the step of:

stopping the step of outputting the phone number of said handset unit to said communication network, when an instruction is given within a third predetermined time duration to stop calling said handset unit through another radio telephone system after the step has started of announcing that said handset unit is not in the service area of the same radio telephone system.

9. The method according to claim 7, wherein said third step further comprises the step of:

outputting the phone number of said handset unit to said communication network, when an instruction is given within the third predetermined time duration to call said handset unit through another radio telephone system after the step has started of announcing that said handset unit is not in the service area of said same radio telephone system.

10. In a composite radio telephone system, in which a plurality of radio telephone systems are connected through a communication network to one another, and a handset unit belonging to one of the radio telephone systems can be used under another one of the radio telephone systems, a calling apparatus of the corresponding radio telephone system to which said handset unit belongs, comprising:

call-number storage means for storing in combination an extension number and a phone number of said handset unit, said extension number being used for calling said handset unit through a radio base station in the corresponding radio telephone system and said phone number being used for calling said handset unit through a radio base station in another radio telephone system;

calling means adapted for generating a designation signal for designating one of an extension-call mode and an outside-line call mode, the extension mode being for calling said handset unit through an extension line of said corresponding radio telephone system and the outside-line call mode being for calling said handset unit through an outside-line;

call-control means for receiving the designation signal generated by said calling means, and for setting the extension-call mode to perform an extension-call operation when said received designation signal designates the extension-call mode, and for setting the outside-line call mode to perform an outside-line call operation when said received designation signal designates the outside-line call mode; and outside-line call instruction means for outputting an instruction signal to said call-control means when said call-control means sets the extension-call mode for calling said handset unit through the extension line of said corresponding radio telephone system, said instruction signal being for instructing said call-number storage means to send to the communication network the phone number stored therein in combination with the extension number of said handset unit.

11. The calling apparatus according to claim 10, wherein said corresponding radio telephone system is a cordless telephone apparatus which comprises a radio base station and a plurality of telephone sets including said handset unit, and said call-number storage means and said call-control means are installed in said radio base station.

12. The calling apparatus according to claim 10, wherein said calling means is a telephone set connected to the radio base station of said corresponding radio telephone system.

13. The calling apparatus according to claim 10, wherein said calling means is a handset unit belonging to the corresponding radio telephone system.

14. The calling apparatus according to claim 10, wherein said corresponding radio telephone system is a system cordless telephone apparatus which comprises a Private Branch Exchange, a plurality of radio base stations connected to said Private Branch Exchange and a plurality of handset units, and said call-number storage means and said call-control means are installed in said Private Branch Exchange.

15. The calling apparatus according to claim 10, wherein said outside-line call instruction means is a manually operable switch.

16. The calling apparatus according to claim 10, wherein said outside-line call instruction means comprises:

judging means for judging whether said handset unit is in the service area of said corresponding radio telephone system; and timer means which is driven when said judging means determines that said handset unit is not in the service area of said corresponding telephone system, and outputs the instruction signal when said timer means counts up a time.

17. The calling apparatus according to claim 16, wherein said outside-line call instruction means has announcing means for announcing that said handset unit is in the service area of said corresponding radio telephone system when said judging means determines that said handset unit is not in the service area of said corresponding telephone system.

18. The calling apparatus according to claim 10, wherein said outside-line call instruction means has judging means for judging whether said handset unit is in the service area of said corresponding radio telephone system, and outputs the instruction signal when said Judging means determines that said handset unit is not in the service area of said corresponding telephone system.

19. The calling apparatus according to claim 18, wherein said judging means of said outside-line call instruction means judges whether the response signal is received from said handset unit within a predetermined time duration after said handset unit has been called through the extension line.

20. The calling apparatus according to claim 18, further comprising:

memory means for storing data representing whether said handset unit is in the service area of said corresponding radio telephone system; and updating means for periodically updating the data stored in said memory means, and wherein said judging means of said outside-line call instruction means judges based on the data stored in said memory means whether said handset unit is in the service area of said corresponding radio telephone system.

* * * * *